US008321794B2

(12) United States Patent
Combel et al.

(10) Patent No.: US 8,321,794 B2
(45) Date of Patent: Nov. 27, 2012

(54) RICH CONFERENCE INVITATIONS WITH CONTEXT

(75) Inventors: Craig Combel, Issaquah, WA (US); Justin Maguire, Redmond, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 785 days.

(21) Appl. No.: 11/770,365

(22) Filed: Jun. 28, 2007
(Under 37 CFR 1.47)

(65) Prior Publication Data
US 2009/0044132 A1     Feb. 12, 2009

(51) Int. Cl.
*G06F 15/00* (2006.01)
*G06F 13/00* (2006.01)

(52) U.S. Cl. .................................. 715/748; 715/753

(58) Field of Classification Search .......... 715/748–753, 715/736–738, 804–805
See application file for complete search history.

(56) References Cited

U.S. PATENT DOCUMENTS

| 6,594,693 | B1 * | 7/2003 | Borwankar | 709/219 |
|---|---|---|---|---|
| 6,604,129 | B2 | 8/2003 | Slutsman et al. | |
| 6,769,067 | B1 * | 7/2004 | Soong | 726/2 |
| 6,963,900 | B2 | 11/2005 | Boyd | |
| 7,062,021 | B2 | 6/2006 | Starbuck et al. | |
| 2004/0001446 | A1 * | 1/2004 | Bhatia et al. | 370/261 |
| 2004/0088362 | A1 | 5/2004 | Curbow et al. | |
| 2004/0117446 | A1 | 6/2004 | Swanson | |
| 2005/0018827 | A1 | 1/2005 | Himmel et al. | |
| 2005/0198167 | A1 | 9/2005 | Roskowski et al. | |
| 2006/0184885 | A1 | 8/2006 | Hayes et al. | |
| 2006/0242639 | A1 | 10/2006 | Manion et al. | |
| 2007/0150608 | A1 * | 6/2007 | Randall et al. | 709/228 |
| 2007/0156811 | A1 * | 7/2007 | Jain et al. | 709/204 |
| 2007/0161402 | A1 * | 7/2007 | Ng. et al. | 455/554.2 |
| 2008/0040189 | A1 * | 2/2008 | Tong et al. | 705/9 |
| 2008/0207233 | A1 * | 8/2008 | Waytena et al. | 455/466 |
| 2008/0226051 | A1 * | 9/2008 | Srinivasan | 379/202.01 |

FOREIGN PATENT DOCUMENTS

EP     1209849 A2     3/2007

OTHER PUBLICATIONS

Conference Visuals Scheduling Meetings Guide. http://www.conferencevisuals.net/docs/CVSchedulingMeetingsGuide.pdf. Last accessed Nov. 29, 2006.
Cisco Meetingplace for Outlook 5.3. http://www.cisco.com/application/pdf/en/us/guest/products/ps6111/c1650/cdccont_0900aecd801c5dca.pdf. Last accessed Nov. 29, 2006.
GoToMeeting. http://www.masternewmedia.org/reports/webconferencing/guide/gotomeeting/ease_of_access.htm. Last accessed Nov. 29, 2006.

* cited by examiner

*Primary Examiner* — Cao "Kevin" Nguyen (57) ABSTRACT

Systems and methods that enable conference attendee(s) to invite others to the conference and provide a rich set of contextual information about the conference upfront to the invitee(s). A communicator component enables document related to the conference to be automatically shared and can further supply the name of the document and the location of the document. Hence, an invitee can make an informed decision about joining the conference and evaluate relevance of the conference up front (e.g., prior to joining).

20 Claims, 10 Drawing Sheets

RICH CONFERENCE INVITATIONS WITH CONTEXT

BACKGROUND

Advances in technology such as computer and communication systems have transformed many important aspects of human and computer interactions. For example, voice answering systems now provide a convenient manner for a user to electronically capture a message and forward it to another. With technology advancements such as wireless and Internet systems, electronic messaging systems have become much more sophisticated. For example, these systems can further implement e-mail, text messaging, instant messaging, pagers, personal digital assistants (PDAs) and the like, wherein information can be readily sent and retrieved synchronously.

Moreover, computing devices can be readily accessed to share information during user conferences, such as through a social network, Blogs, or through on-line meetings, and the like. This information can include collaboration goals, interests, photos, and typically any type of data a user desires to share. Similarly, organizations can retain information relating to employees, organizational hierarchies, job titles and descriptions, as well as information relating to day-to-day activities of employees, projects, competitors and the like.

Accordingly, whenever employees are spread out over large working space such as on campus of several buildings, meeting scheduling can become an important aspect of corporate profitability, to ensure the timeliness of projects and associated corporate missions, for example. Moreover, scheduling meetings electronically includes inviting recipients and reserving a conference room, among other things. Nonetheless, inefficient scheduling for meetings often occurs in today's work environments. For example, where meetings are a daily occurrence for many employees, often meeting agendas are inadequately distributed, or not at all. Furthermore, frequent changes to the meeting agenda such as changes to: attendee list, subject matter, related documents, and the like can further complicate these conferences.

Typically to competently administer meetings, substantial amount of time need to be spent for preparation and planning to produce efficient results. Moreover, such meetings can fail to be productive due to other factors, such as scenarios when participants do not know each other and may be hesitant to participate or readily offer related documents or other information, as there exists little or no familiarity between participants. In particular, such problems can be exacerbated when one or more participants are remote from the meeting place (e.g., meeting is conducted as a teleconference.) In many of such instances, the meeting is typically not as productive as expected, since the required information is not readily located and available for sharing between participants.

Moreover, meetings are expected to enable participants to achieve common goals, while mitigating the amount of planning time, regardless of the attendees' physical location. In addition, meetings are expected to function as more than merely isolated events, and instead should strive to form an integrated segment of an overall collaborative framework or organizational goal. Furthermore, attendees should readily have access to the most accurate, up-to-date information in order to assist participants perform at a high level of efficiency.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation enables conference attendee(s) to invite others to the conference and provide a rich set of contextual information about such conference upfront to the invitee(s), by employing a communicator component—so that the invitees can make an informed decision about joining the conference and evaluate relevance of the conference up front (e.g., prior to joining). Such communicator component enables automatic sharing for documents related to the conference (e.g., through a session initiation protocol—SIP) between the participants of the conference—wherein the communicator component can supply the name of the document and the location thereof. Hence, a rich contextual form of conversation initiation is supplied that holistically addresses requirements for both the inviter and invitee (e.g., mitigating a requirement of manual intervention by conference participants, such as attaching documents to e-mails for sharing thereof.)

In a related aspect, a graphical user interface associated with the communicator component enables a participant to define or choose from existing contextual information to share with other invitees, such as entering a reason, setting importance for an invitation, and choosing to send any related items or links to related items to such invitees. In addition, contextual information and items that are part of a current conversation (e.g., a teleconference) can be automatically included with the invitation. Moreover, a notification component associated with the communicator component can transmit an alert to the participants/end points regarding the conference (e.g., document lists to be shared, conference schedules, and the like), wherein the invitation can be populated with name of documents to be shared, such as inserting links in the invitation window. Furthermore, the notification component can accept various levels of importance set by participants of the conference, and further supply information related to its context. Such communication can be provided in a synchronous matter and in form of an instant message, for example.

According to a further aspect, the communicator component can infer the subject of the conference, and automatically supply participants with documents related thereto (e.g., without user intervention). Moreover, inferences can be made regarding type of end point the invitee is located thereon (e.g., outside a corporate fire wall), and manner that conference documents should be supplied thereto (e.g., hyper links, automatic generation of e-mails, and the like). Furthermore, at each stage of the conference the communicator component can obtain (or supply location) of related documents to the invitees.

According to a methodology of the subject innovation, initially a conference is initiated between at least two participants. A list of other participants and/or contextual information regarding the conference can then automatically be presented to such participants or other invitees from a conversation window. Upon selection of additional participants, the system can automatically generate a list of documents related to the conference (e.g., via an automatic correlation) and supply such list to the participants/invitees. Hence, conference participants can readily access documents related to the conference.

In a related methodology, initially an inference is made regarding the context of the conference. Such inference can for example include: the topic and documents associated with the conference, type of endpoints for the users, and the like. Subsequently, an automatic correlation can be made to documents related to the conference, wherein a measure of relevance for the documents supplied to the invitees can include the file sharing criteria (e.g., predetermined importance level assigned to documents, type of documents, and the like.) Such documents can then be supplied to the participants, to provide for a rich conversation for the users.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
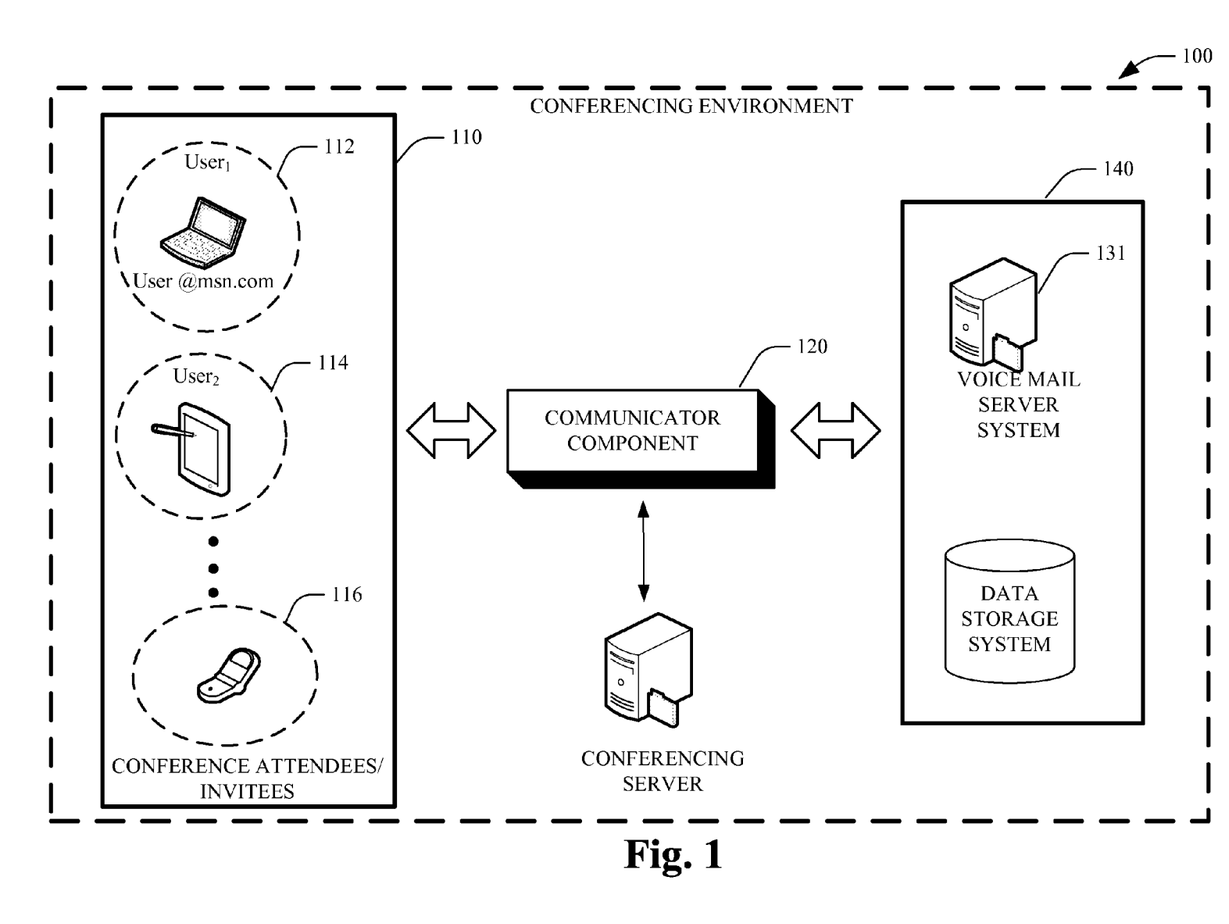
FIG. 1 illustrates a block diagram of an exemplary system with a communicator component for a conferencing system in accordance with an aspect of the subject innovation.

FIG. 1 illustrates a system 100 that enables conference attendee(s) to invite others to the conference, and provides a rich set of contextual information about the conference upfront to the invitee(s), by employing a communicator component 120 so that the invitees 110 can make an informed decision about joining the conference and evaluate relevance of the conference up front (e.g., prior to joining). The communicator component 120 further enables documents related to the conference to be automatically shared (e.g., through a session initiation protocol—SIP) among the participants of the conference, wherein such communicator component can obtain the name of the document(s) and their location.

As illustrated in FIG. 1, the client side 110 can include a plurality of invitees or conference initiators in form of participants/users 112, 114, 116 (1 thru N, where N is an integer). The users 112, 114, 116 can also be part of a network (e.g., wireless network) such as a system area network or other type of network, and can include several hosts, (not shown), which can be personal computers, servers or other types of computers. Such hosts generally can be capable of running or executing one or more application-level (or user-level) programs, as well as initiating an I/O request (e.g., I/O reads or writes). In addition, the network can be, for example, an Ethernet LAN, a token ring LAN, or other LAN, or a Wide Area Network (WAN). Moreover, such network can also include hardwired and/or optical and/or wireless connection paths.

For example, when a participant/attendee such as a user 112, 114, 116 initiates a conference in form of a teleconference/e-mail that is routed through the voice mail/e-mail server system 130, a rich contextual form of conversation initiation is supplied that holistically addresses requirements for both the inviter and invitee (e.g., mitigating a requirement of manual intervention by conference participants, such as attaching documents to e-mails for sharing thereof.)

The connections can be shared among the users 112, 114, 116 that can employ: personal computers, workstations, televisions, telephones, and the like, for example. Moreover, the networks can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. It is to be appreciated that the wireless communication network can be cellular or WLAN communication network; such as Global System for Mobile communication (GSM) networks, Universal Mobile Telecommunication System (UMTS) networks, and wireless Internet Protocol (IP) networks such as Voice over Internet Protocol (VoIP) and IP Data networks For example, the portable device employed by users or invitees can be a hand-held wireless communication device that can communicate with a wireless communication network, (e.g. wireless communication network) to upload and download digital information, via a cellular access point and/or via a wireless access network (WLAN) access point, such as a cellular base station, mobile switching center, 802.11x router, 802.16x router and the like. Further examples of the portable user devices can include a cellular communication device, a multi-mode cellular device, a multi-mode cellular telephone, a dual-mode cellular device, a dual-mode cellular/WiFi telephone, or like cellular and/or combination cellular/fixed internet protocol (IP) access devices.

Figure 2:
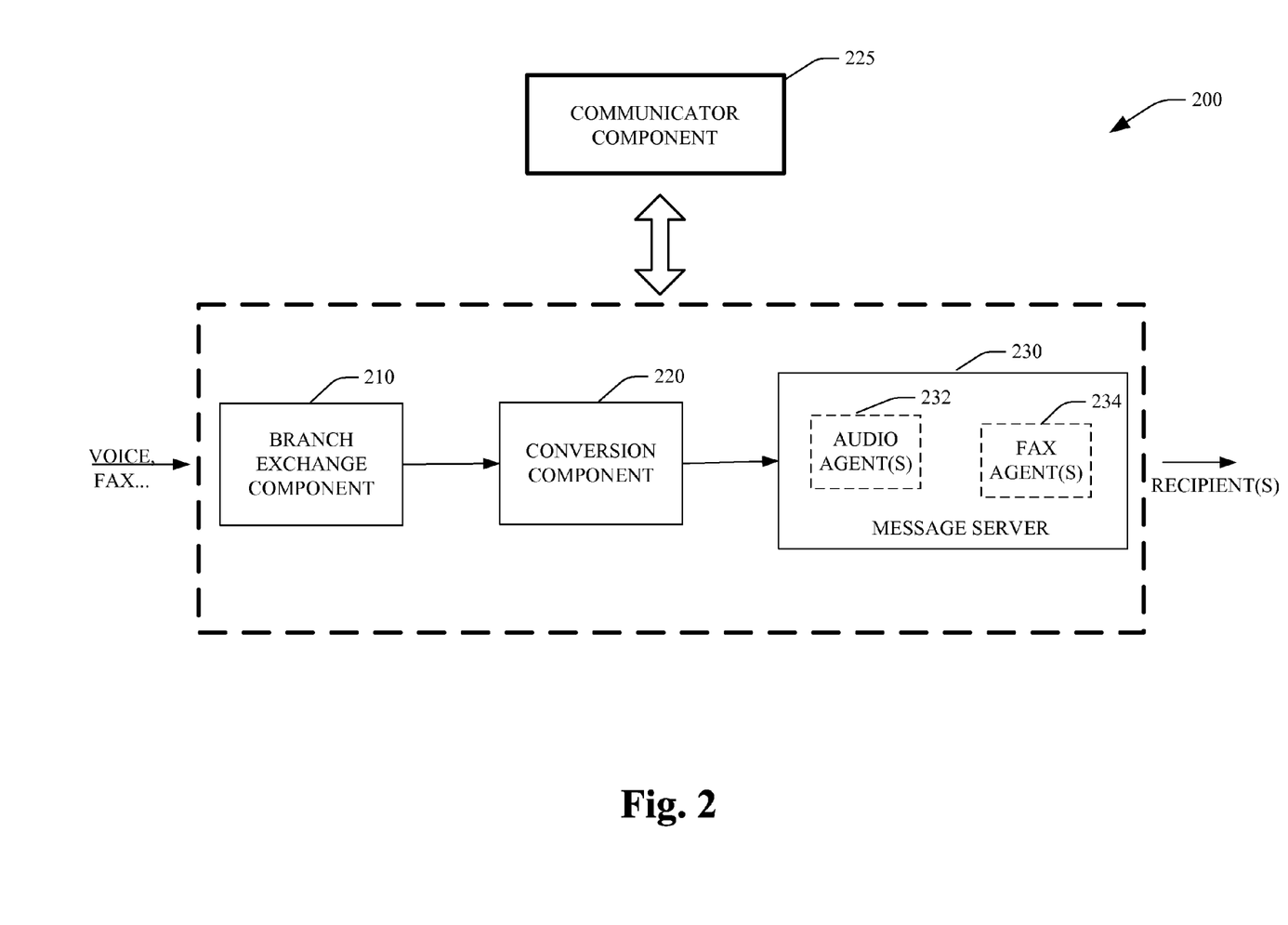
FIG. 2 illustrates a further exemplary aspect of a conferencing system that interacts with a communicator component according to a particular aspect of the subject innovation.

FIG. 2 illustrates a further exemplary aspect of a conferencing system 200 that employs a communicator component 225 according to a particular aspect of the subject innovation. The system 200 includes a branch exchange component 210 that acquires voice communications, and can include an Intranet protocol (IP) branch exchange (IPBX). Furthermore, the branch exchange component 210 can be public (e.g., central office exchange service) or private (PBX). Accordingly, the branch exchange component 210 can receive communications from conventional telephone systems or over the Internet, among others, via a telephone protocol, IP protocol (e.g., H.323, SIP . . . ) or any other public or proprietary protocol. Upon receipt of a communication the branch exchange component 210 can route the communication to the conversion component 220. For example, the branch exchange component 210 can forward a call that was not answered or a phone number configured to answer a fax to the conversion component 220. The conversion component 220 can receive a communication from the branch exchange component 210 (or via a connection provided thereby), and such conversion component 220 can convert the received communication to an email. For example, the communications can subsequently or concurrently be transformed into an SMTP (Simple Mail Transfer Protocol) message. As illustrated, the system 200 can further employ the communicator component 225, associated with an office communication server (not shown) that provides a rich set of contextual information about the conference upfront to the invitee(s).

In a related aspect, the conferencing system 200 can incorporate e-mail capabilities as part of its conferencing, wherein a voice or facsimile message can be recorded or saved and provided as an attachment. Furthermore, a portion of the content of the message can be encoded in the body, for instance in a MIME (Multipurpose Internet Mail Extension) format. Additional information can also be captured in the body such as message type (e.g. voice, fax), calling telephone number, voice message duration, voice message sender name, attachment name, fax number of pages and the like. Moreover, the MIME message can subsequently be converted into an internal representation, which can be stored with an internal representation of a message classification. This classification can further be employed by the communicator component 225 to display an optimized UT, as described in detail infra.

In a related aspect, the conversion component 220 can also be extensible, to employ third party and/or non-native functionality, for instance provided by plug-in components (not shown). For example, such plug-in component can provide algorithms to facilitate translating speech-to-text or for optical character recognition, and hence not all functionality need to be provided solely by the conversion component 220. Accordingly, the conversion component 220 can be updated such that it can employ suitable techniques or mechanisms associated with an invite application or email generation as part of the conferencing system 200, for example.

Also, a generated email or SMTP message can be transmitted from the conversion component 220 to a message server 230. The message server 230 can process messages for delivery to an intended recipient mailbox(es), among other things, such that they can be received or retrieved by an email application (e.g., viewer/editor and POP or IMAP client). For example, the server 230 can correspond to a mailbox, SMTP and/or a bridgehead server. It should also be appreciated that the conversion component 220 can be an SMTP client that communicates with the SMTP server. In addition to forwarding messages to a recipient's mailbox or mailboxes, the message server 230 can filter such messages.

The message server 230 can employ audio agents 232 to scan the audio rather than the text preview of the message. Such audio agents 232 can evaluate based on tone of voice, volume, and/or obscenity checking, among other things. Similarly, fax agents 234 can scan the structure of the email separate from the converted structured document or preview. It should also be noted that these agents 232 and 234 can be plug-ins or add-ons produced by the server vendor or third-party vendors, among others. As explained earlier, the communicator component 225 can supply a rich contextual form of conversation initiation, which holistically addresses requirements for both the inviter and invitee (e.g., a requirement of manual intervention by conference participants, such as attaching documents to e-mails for sharing thereof can be mitigated, and other communication systems are well within the realm of the subject innovation.

Figure 3:
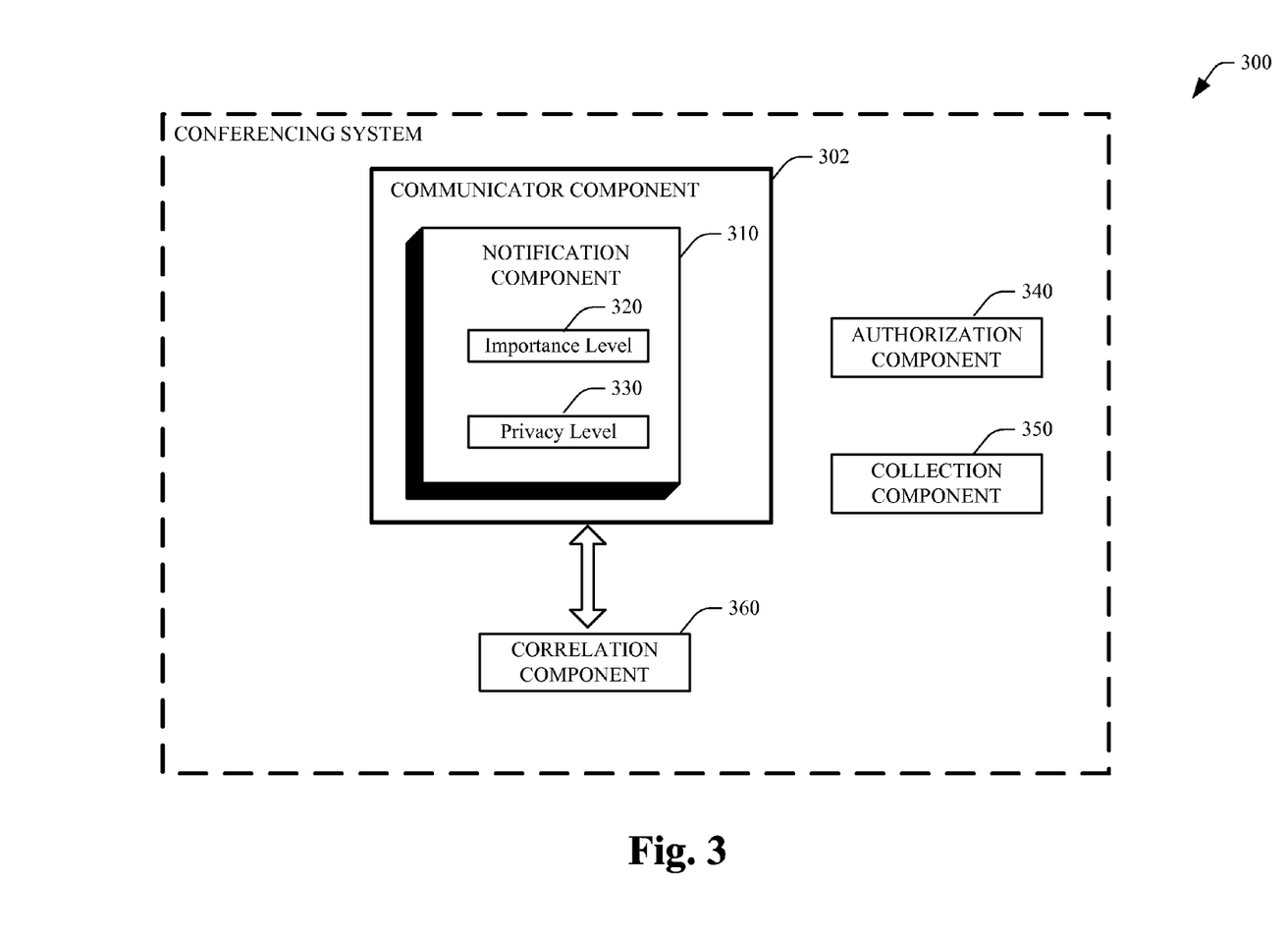
FIG. 3 illustrates a particular block diagram of a communicator component as part of a conferencing system of the subject innovation.

FIG. 3 illustrates a particular block diagram of a notification component 310, associated with a communicator component 302 of the subject innovation. The notification component 310 can transmit an alert to the participants/end points regarding the conference (e.g., document list to be shared, conference schedule, and the like), wherein the invitation can also be populated with such contextual information via inserting links in the invitation window, for example. In addition, the notification component 310 can set various levels of importance to the conference via a field 320, and further supply information related to the context of the conference. Moreover, the notification component 310 enables a user or initiator of a conference to set a privacy level 330 for various documents that are to be shared during the conference (e.g., access restriction for confidential documents.) The communication can be provided in synchronous manner and in form of an instant message, for example.

The communicator component 302 enables document related to the conference to be automatically shared (e.g., through a session initiation protocol—SIP) among the participants of the conference, wherein the communicator component 302 can obtain the name of the document and the location of the document. As illustrated in FIG. 3, an authorization component 340 associated with the teleconferencing system 300 can apply permissions to allow some users to access some documents and/or messages that are exchanged during a conference and further block other users from reaching the exchanged communication. Moreover, a collection component 350 can collect information regarding participants of a conference such as names, email aliases, extension numbers, and the like, from a meeting request or agenda, for example. The notice for a conference can be in form of a telephone call initiation, wherein one person dials a telephone number to call another person that can be known or unknown to the person initiating the telephone call. The notice can also include a topic to be discussed by the participants.

Collection component 350 can obtain information relating to the participants and/or the topic. Information relating to the participants can include information that is generally known (e.g., job title, department, supervisor, subordinates, current projects, picture, and the like). Moreover, contextual information related to the topic for the conference can include reports, papers, data related to the topic or authored by a participant/invitee, documents shared between participants, names of other people that have knowledge of the topic and the like. Information can also relate to an organization (e.g., sales reports, topic experts, and the like) and/or public information (e.g., news, blogs, maps, and the like).

The gathered information can be communicated to a correlation component 360 that can determine relationships, such as a common relationship, between the participants/invitees or between other information compiled by the collection component 350. For example, the correlation component 360 can show links between participants, such as if one participant reports to another or if two or more report to the same supervisor. Other links can include papers co-authored, other projects in which two or more participants were involved, or other links between the various types of information gathered by collection component 350.

In a related aspect, the information and associated relationships can be output to the meeting participants/invitees authorized to view this information. Such information can be presented by output component (not shown), which can present the information in a variety of formats (e.g., visual, audio). The information can be provided before, during or after the conference.

For example, an invitee may desire to know who else will be attending the scheduled conference. Information regarding other participants can thus be presented as well as the relationship between those participants and the individual requesting the information. Accordingly, the invitee can realize that one of the other participants is working on an unrelated project, yet there exists information that they need to share (e.g., documents, a brief discussion). Upon such determination, the conferencing system 300 can automatically supply the additional document for invitees to the scheduled conference.

Acquiring contextual information (e.g., information related to participants, inferring required documents, determining relationships, and the like) can occur continuously; and information initially collected can be dynamically updated by the conferencing system 300. Thus, if a particular project is on going, as new participants are added and/or as participants are deleted, the information can be automatically updated. For example, new information can be posted to a person's profile page and this information can be compiled and output upon request. Accordingly, as participants are added or deleted, the interrelationship between the various participants can change and system 300 can automatically update the visual linking of participants and/or other information associated therewith. As such, the system 300 can transform a meeting into a vivacious entity that is more than merely a discussion of a common topic but instead is an on-going, dynamic network of contributions and resources that can be selectively exposed and utilized.

Figure 4:
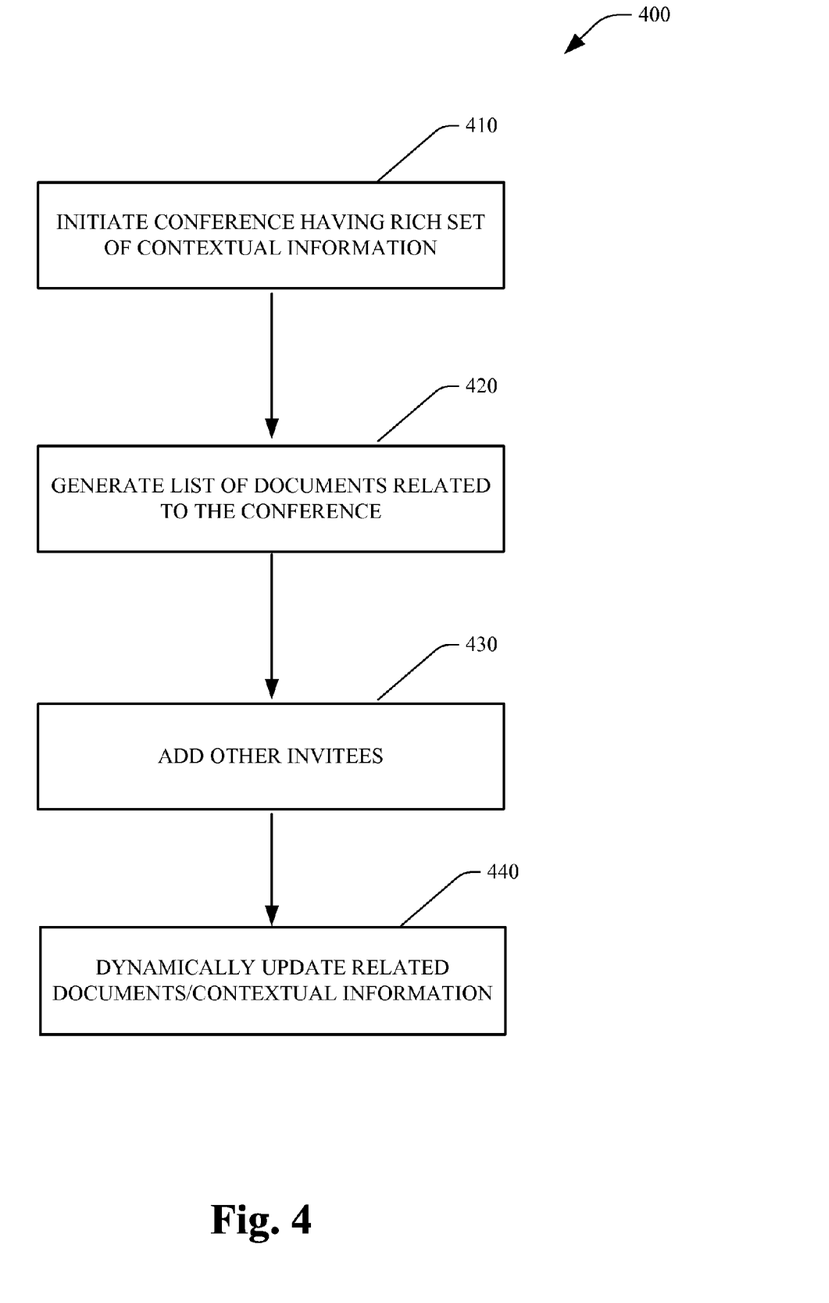
FIG. 4 illustrates a related methodology of a rich conference invitation with context in accordance with an aspect of the subject innovation.

FIG. 4 illustrates a related methodology of a rich conference invitation with context in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

According to a methodology 400 of the subject innovation, at 410 a conference (e.g., a teleconference) is initiated between two participants, wherein rich set of contextual information about the conference is presented upfront to other invitee(s) of such conference. At 420 a list of documents related to the conference is automatically generated. Subsequently, and at 430 a list of other invitees can then be presented to participant(s) who initiated the conference (e.g., from a conversation window.) Upon selection of additional participants, at 440 the system can dynamically update the automatically generated list of documents related to the conference (e.g., via an automatic correlation) and supply such data to the invitees. Hence, conference participants can readily access documents related (e.g., a requirement of manual intervention by conference participants, such as attaching documents to e-mails for sharing thereof can be mitigated.)

Figure 5:
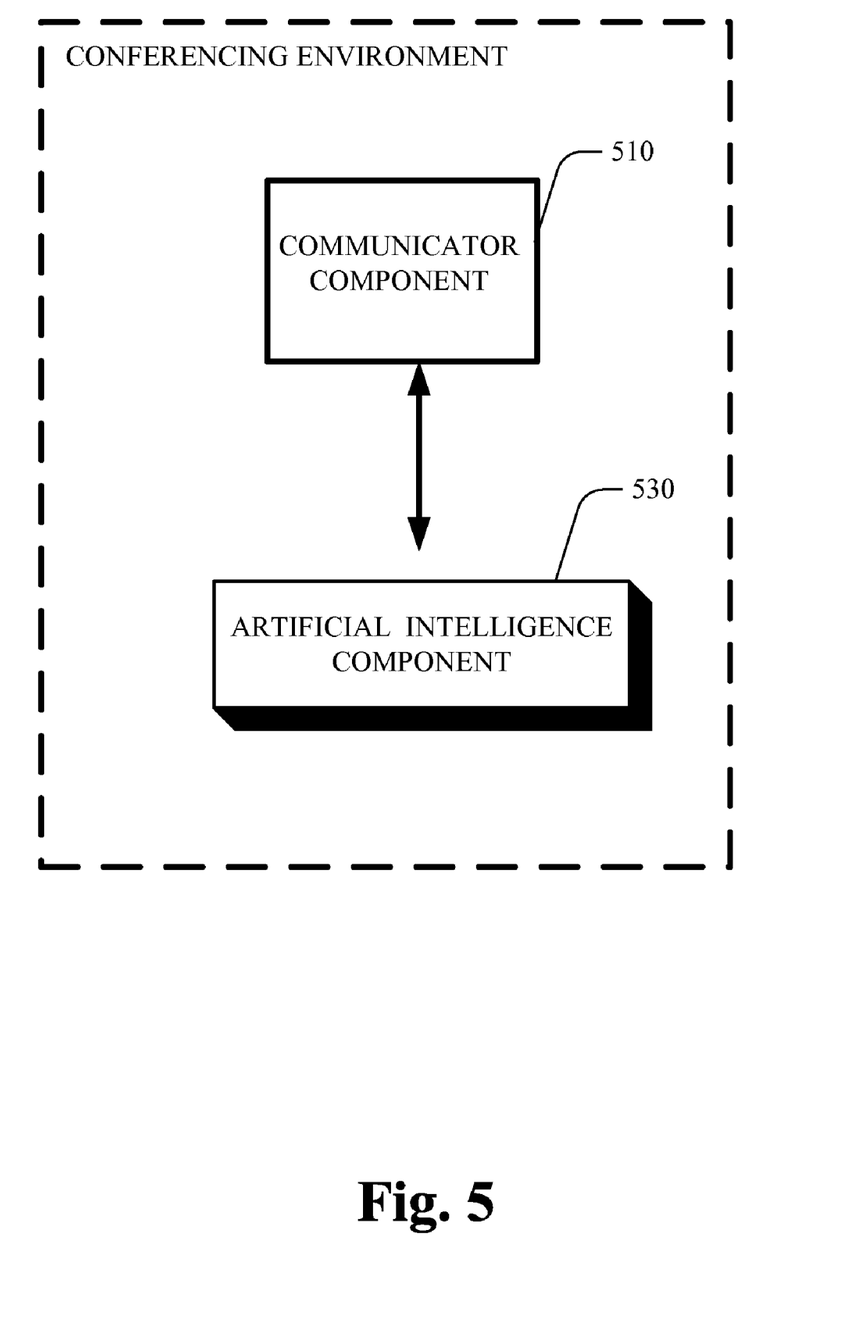
FIG. 5 illustrates an artificial intelligence component associated with a communicator component of the subject innovation.

FIG. 5 illustrates an artificial intelligence (AI) component 530 that can be employed to facilitate inferring and/or determining when, where, how to generate contextual information for a conference in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 530 can employ any of a variety of suitable AI-based schemes as described supra in connection with facilitating various aspects of the herein described invention. For example, a process for learning explicitly or implicitly how documents and relationships are to be correlated for generation of invitations can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=\text{confidence}(\text{class})$.

Accordingly, the communicator component 510 can infer the subject of the conference, and automatically supplies participants with documents related thereto (e.g., without user intervention). Moreover, an inference can be made regarding type of end point the invitee is located thereon (e.g., outside a corporate fire wall), and manner that conference documents should be supplied thereto (e.g., hyper links, automatic generation of e-mails, and the like). Furthermore, at each stage of the conference the communicator component can obtain (or supply location) of related documents to the invitees.

Figure 6:
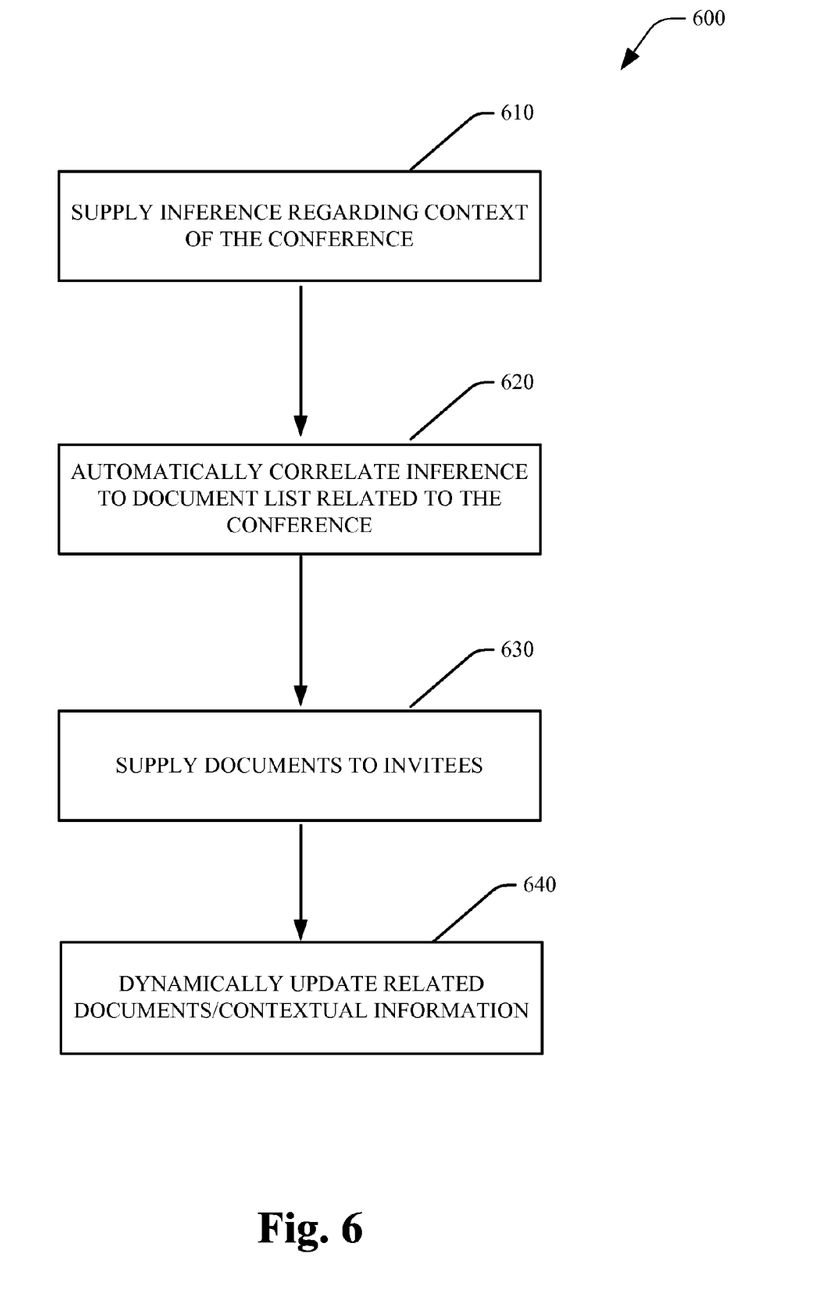
FIG. 6 illustrates a further methodology of initiating a conference in accordance with a further aspect of the subject innovation.

FIG. 6 illustrates a related methodology 600 of supplying a rich set of contextual information according to a further aspect of the subject innovation. Initially and at 610, an inference is made regarding the context of the conference. Such inference can for example include: the topic and documents associated with the conference, type of endpoints for the users, and the like. Subsequently, and at 620 an automatic correlation can be made to documents related to the conference, wherein a measure of relevance for the documents supplied to the invitees can include the file sharing criteria (e.g., predetermined importance level assigned to documents, type of documents, and the like.) Such documents can then be supplied to the participants/invitees at 630 to provide for a rich conferencing interaction for the users. At 640 the contextual information can be dynamically updated to reflect interaction of the conferencing system with additional invitees.

Figure 7A:
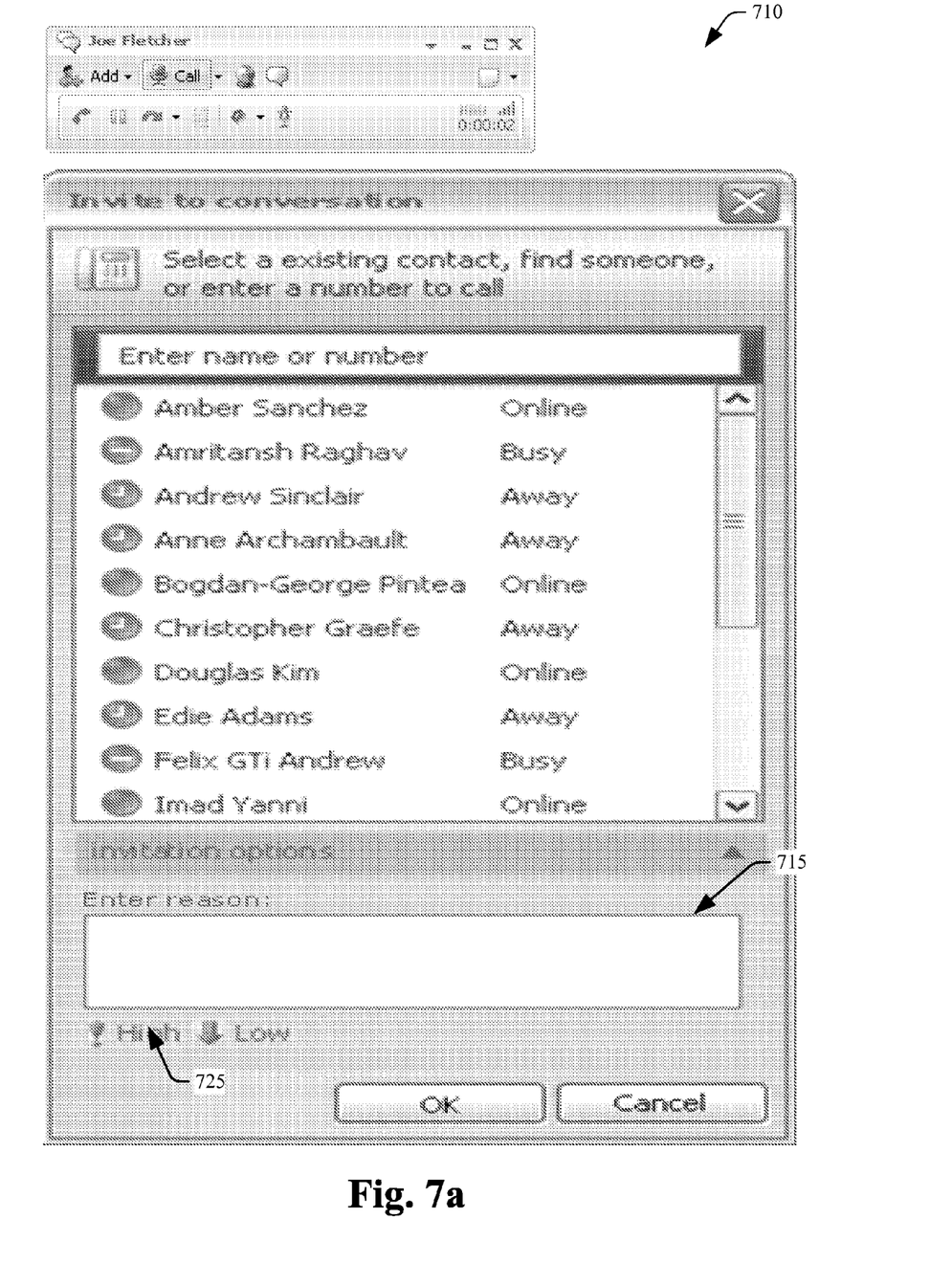
FIG. 7a and FIG. 7b illustrate exemplary implementations for a rich conference invitation according to an aspect of the subject innovation.
Figure 7B:
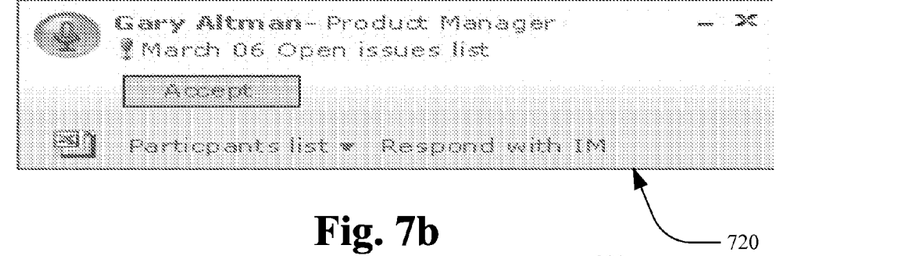

FIG. 7a and FIG. 7b illustrate exemplary graphical user interface (GUI) implementations for a rich conference invitation according to an aspect of the subject innovation. Each of the GUIs 710, 720 associated with the communicator component enables a user to define or choose from existing contextual information to share with the invitee, such as entering a reason, setting importance for an invitation, and choosing to send any related items or links to related items to the invitee. Such user interface 710, 720 further enable participants in the conference to: indicate the subject of a conversation; provide contextual information about the conversation such as links to document(s) or the document itself that is being discussed as part of the conversation; allow the invitee to observe available contextual information in the invitation; and provide a mechanism for sending invitations to invitees that are not singed in. Moreover, invitations that cannot be delivered via SIP, can be delivered thru normal e-mail. For example, an inviter/participant in a conference can be discussing contents of a spreadsheet document with another participant to the conference. The inviter desires to add another person to the conference, and is presented with the user interface 710 with portion 715 to enter a reason for the invitation, and chose an importance level 725. Once the information is completed and a contact is selected, the user clicks ok and a invitation is generated and sent as an APP INVITE to the invitee (e.g., an Application Invite allows a user to invite another user to use a collaboration application, and can be compatible with third part clients).

Figure 8:
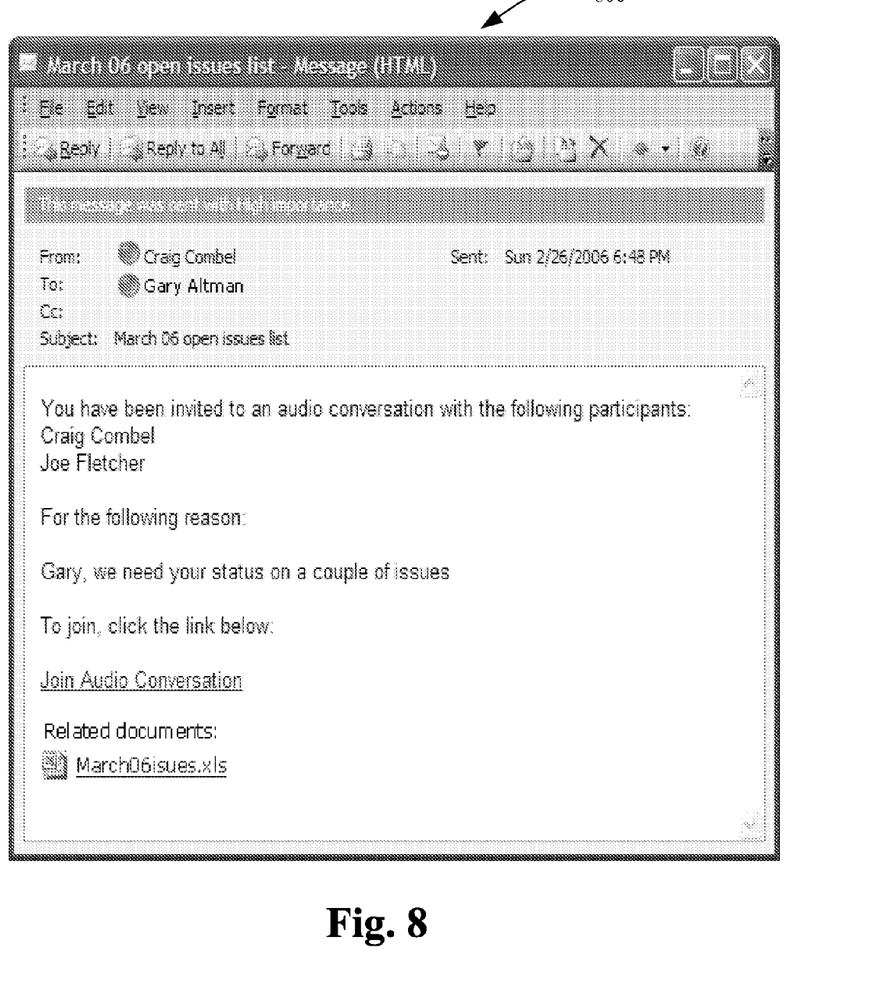
FIG. 8 illustrates a further exemplary graphical user interfaces in accordance with a further aspect of the subject innovation.

Contextual information such as the subject of the conversation, the list of existing participants, active media modes, and a link to the document, are automatically included in the invitation. As explained earlier, such rich contextual information can be delivered to the contact in the form of an alert on their endpoint, a notification within a pre-existing conversation window, or delivered as an invitation via SIP or Email. Hence, upfront an invitee can make an informed decision regarding participation in the conference. As explained in detail above and as a fall back position, invitees who are not signed in, or that cannot be reached via the SIP channel-instead can receive an invitation in form of an e-mail 800 of FIG. 8. Such e-mail can typically convey all aspects of context defined by the inviter.

Figure 9:
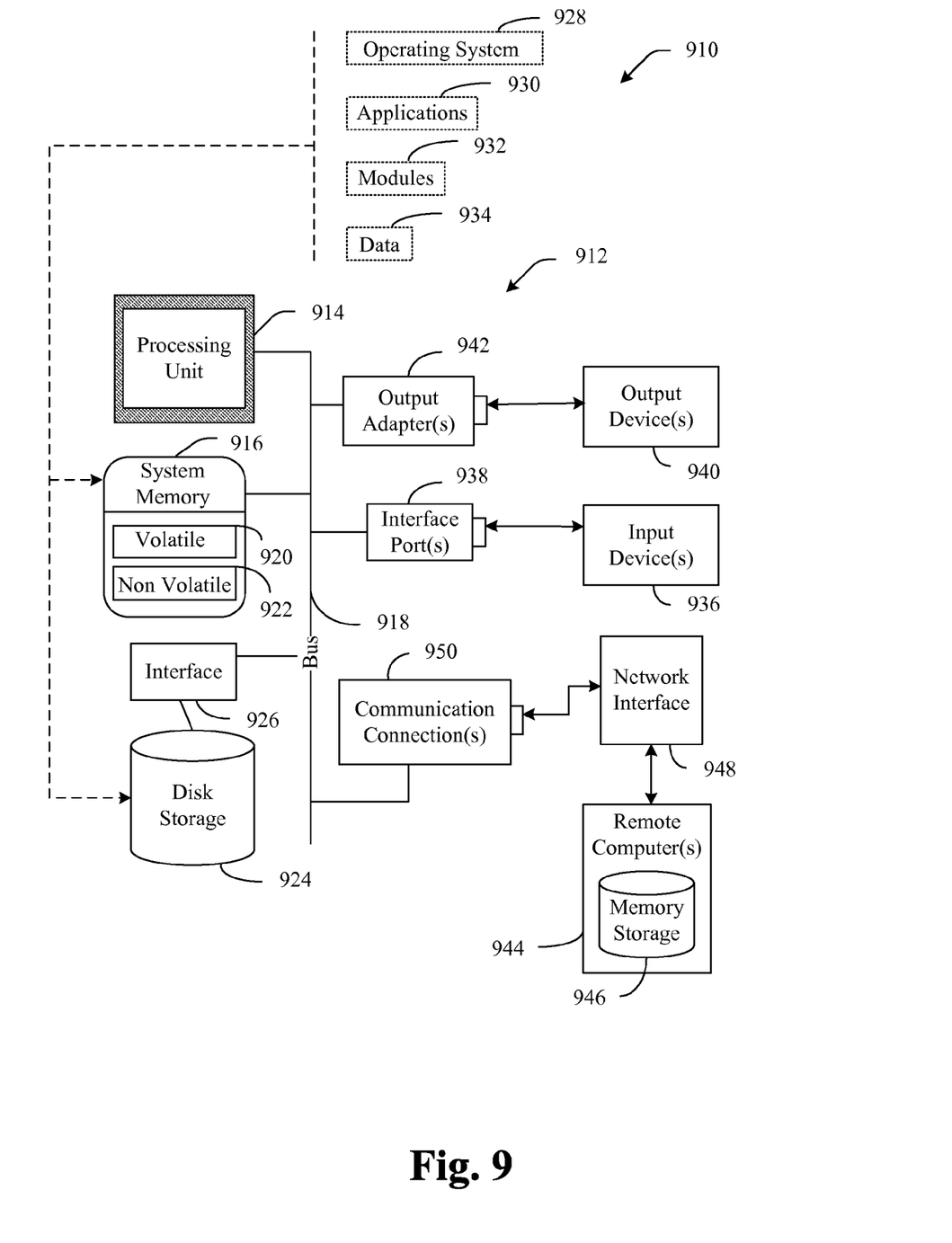
FIG. 9 illustrates an exemplary operating environment for implementing various aspects of the subject innovation.
Figure 10:
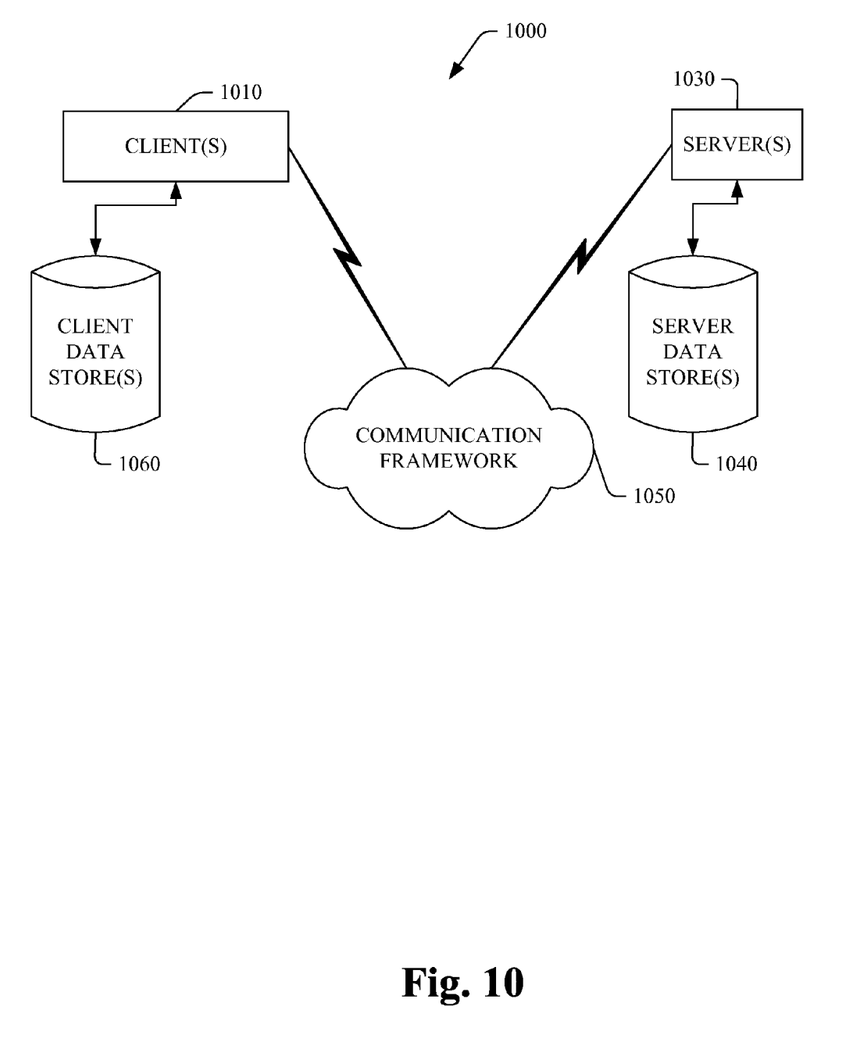
FIG. 10 illustrates a further schematic block diagram of a sample computing environment with which the subject innovation can interact.

In order to provide a context for the various aspects of the disclosed subject matter, FIGS. 9 and 10 as well as the following discussion are intended to provide a brief, general description of a suitable environment in which the various aspects of the disclosed subject matter may be implemented.

While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch ... ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for implementing the rich conference invitations with context of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:
   a collection component configured to collect information about a conference;
   a correlation component configured to determine at least one relationship between aspects included in the information about the conference; and
   a communicator component configured to infer a subject of the conference, wherein the communicator component is further configured to automatically identify documents related to an inferred subject of the conference independent of an intervention from invitees of the conference and based on the at least one relationship between aspects included in the information about the conference, and wherein the communicator component facilitates an automatic sharing of the documents between the invitees.

2. The computer implemented system of claim 1, the conferencing system further comprising a graphical user interface (GUI) configured to enable a participant of the conference to view the contextual information.

3. The computer implemented system of claim 2, wherein the information about the conference includes contextual information related to an importance of the conference.

4. The computer implemented system of claim 3 further comprising a notification component configured to transmit an alert to the participant.

5. The computer implemented system of claim 1 further comprising an artificial intelligence component configured to infer documents related to the conference.

6. The computer implemented system of claim 1, further comprising a notification component configured to set various levels of importance to the conference.

7. The computer implemented system of claim 1, wherein the conferencing system further comprises a branch exchange component configured to acquire voice communications.

8. The computer implemented system of claim 1, wherein the conferencing system further comprises a conversion component configured to convert received communications to e-mails.

9. The computer implemented system of claim 7, wherein the conferencing system is configured to implement a Session Initiation Protocol (SIP).

10. The computer implemented system of claim 2, wherein the GUI comprises a field that indicates reasons for the conference.

11. A computer implemented method comprising the following computer executable acts:
   collecting information about a conference;
   determining at least one relationship between aspects included in the information about the conference;
   inferring a subject of the conference;
   identifying documents related to an inferred subject of the conference independent of an intervention from invitees of the conference and based on the at least one relationship between aspects included in the information about the conference; and
   automatically sharing the documents between the invitees.

12. The computer implemented method of claim 11 further comprising receiving a decision of non-participation from an invitee.

13. The computer implemented method of claim 11 further comprising transmitting an alert to the invitees.

14. The computer implemented method of claim 11 further comprising setting an importance level for the conference.

15. The computer implemented method of claim 11 further comprising initiating the conference as a teleconference.

16. The computer implemented method of claim 11 further comprising dynamically updating the at least one relationship.

17. The computer implemented method of claim 11 further comprising inferring a list of documents related to the conference.

18. The computer implemented method of claim 11 further comprising employing a Session Initiation Protocol.

19. The computer implemented method of claim 11 further comprising selecting additional invitees to participate in the conference.

20. A computer-readable storage memory comprising:
   computer-readable instructions, the computer-readable instructions including instructions for causing at least one processor to perform the following acts:
   collecting information regarding a conference; determining at least one relationship between aspects included in the information regarding the conference;
   inferring a subject of the conference;
   identifying documents related to an inferred the subject of the conference independent of an intervention from the invitees of the conference and based on the at least one relationship between aspects included in the information about the conference; and
   automatically sharing the documents between the invitees.

* * * * *